United States Patent [19]
Collette et al.

[11] Patent Number: 4,807,679
[45] Date of Patent: Feb. 28, 1989

[54] PNEUMATIC TIRE TREAD HAVING SIPES

[75] Inventors: Jean J. Collette, Bastogne, Belgium; Pierre M. J. Dauvister, Mersch, Luxembourg; Bernard Jonette, Fischbach, Luxembourg; Claude Lardo, Luxembourg, Luxembourg

[73] Assignee: The Goodyear Tire & Rubber Company, Akron, Ohio

[21] Appl. No.: 60,594

[22] Filed: Jun. 11, 1987

[51] Int. Cl.$^4$ .................. B60C 11/06; B60C 11/12
[52] U.S. Cl. ........................ 152/209 R; D12/141; 152/DIG. 3
[58] Field of Search .......... 152/209 R, 209 D, 209 B, 152/DIG. 3; D12/136-151

[56] References Cited

U.S. PATENT DOCUMENTS

| | | | |
|---|---|---|---|
| D. 178,486 | 8/1956 | Balmer et al. ............... | D12/145 |
| D. 194,771 | 3/1963 | Jones ........................... | D12/142 |
| D. 195,077 | 4/1963 | Humphries .................. | D12/142 |
| D. 199,554 | 11/1964 | Jones et al. .................. | D12/142 |
| D. 201,424 | 6/1965 | Humphries .................. | D12/142 |
| D. 207,379 | 4/1967 | Jones ........................... | D12/142 |
| D. 210,344 | 2/1968 | Jones ........................... | D12/141 |
| D. 234,926 | 4/1975 | Allen et al. ................... | D12/143 |
| D. 236,451 | 8/1975 | Baus ............................. | D12/136 |
| D. 251,119 | 2/1979 | Candiliotis et al. ........... | D12/146 |
| D. 261,492 | 10/1981 | Remy ........................... | D12/143 |
| D. 261,496 | 10/1981 | Remy ........................... | D12/147 |
| D. 268,102 | 3/1983 | Clatworthy et al. .......... | D12/140 |
| D. 269,001 | 5/1983 | Hammond et al. ........... | D12/143 |
| D. 269,005 | 5/1983 | Hammond et al. ........... | D12/147 |
| D. 269,173 | 5/1983 | Candiliotis .................... | D12/146 |
| D. 270,149 | 8/1983 | Candiliotis .................... | D12/146 |
| D. 272,053 | 1/1984 | Candiliotis .................... | D12/146 |
| D. 278,617 | 4/1985 | Kojma et al. ................. | D12/147 |
| D. 283,116 | 3/1986 | Nakatami ...................... | D12/142 |
| D. 283,212 | 4/1986 | Martini et al. ................ | D12/143 |
| D. 283,316 | 4/1986 | Candiliotis .................... | D12/147 |
| D. 288,307 | 2/1987 | Ono .............................. | D12/146 |
| 1,452,099 | 4/1923 | Sipe ............................. | 152/DIG. 3 |
| 2,094,636 | 10/1937 | Bull .............................. | 152/DIG. 3 |
| 2,121,955 | 6/1938 | Eger ............................. | 152/209 R |
| 2,197,662 | 4/1940 | Hughes ......................... | 152/209 R |
| 2,221,642 | 11/1940 | Kraft ............................ | 152/209 R |
| 2,294,626 | 9/1942 | Overman ...................... | 152/209 R |
| 2,432,847 | 12/1947 | Woods .......................... | 152/209 R |
| 2,708,957 | 5/1955 | Constantakis et al. ........ | 152/209 R |
| 3,104,693 | 9/1963 | Bolenbach . | |
| 3,874,982 | 4/1975 | Marzocchi et al. ........... | 428/295 |
| 4,299,264 | 11/1981 | Williams ...................... | 152/209 R |
| 4,416,316 | 11/1983 | Clatworthy et al. .......... | 152/209 R |
| 4,424,846 | 1/1984 | Seitz et al. .................... | 152/209 R |
| 4,437,503 | 3/1984 | Seitz et al. .................... | 152/209 R |
| 4,474,223 | 10/1984 | Landers ........................ | 152/209 R |
| 4,480,671 | 11/1984 | Giron ........................... | 152/209 R |
| 4,515,197 | 5/1985 | Motomura et al. ........... | 152/209 R |
| 4,690,189 | 9/1987 | Bradisse et al. ............... | 152/209 R |
| 4,724,878 | 2/1988 | Kabe et al. .................... | 152/209 R |

FOREIGN PATENT DOCUMENTS

| | | | |
|---|---|---|---|
| 0199570 | 10/1986 | European Pat. Off. . | |
| 2814945 | 10/1978 | Fed. Rep. of Germany ... | 152/209 D |
| 0131406 | 10/1981 | Japan ............................ | 152/209 D |
| 697242 | 7/1986 | Japan . | |
| 331107 | 8/1958 | Switzerland . | |
| 707328 | 4/1954 | United Kingdom . | |
| 2051694 | 2/1981 | United Kingdom . | |
| 1006180 | 4/1981 | United Kingdom . | |

Primary Examiner—Michael W. Ball
Assistant Examiner—Geoffrey L. Knable
Attorney, Agent, or Firm—L. R. Drayer

[57] ABSTRACT

A pneumatic tire (10) has a tread portion (11) comprising a plurality of circumferentially extending grooves (21,22,23) which divide the tread into axially spaced lands (24,25,26,27). Each land is subdivided into blocks (32X,32Y) by cross-slits (31). The blocks in each land (24,25,26,27) are arranged so that circumferentially adjacent blocks (32X,32Y) are axially offset relative to each other. The cross-slits (31A,31B,31C) in each land alternate circumferentially between axially extending cross-slits (31B) and biased angle cross-slits (31A,31C). The axially extending cross-slits (31B) are sipes and the biased angle cross-slits (31A,31C) may be either sipes or grooves.

17 Claims, 4 Drawing Sheets

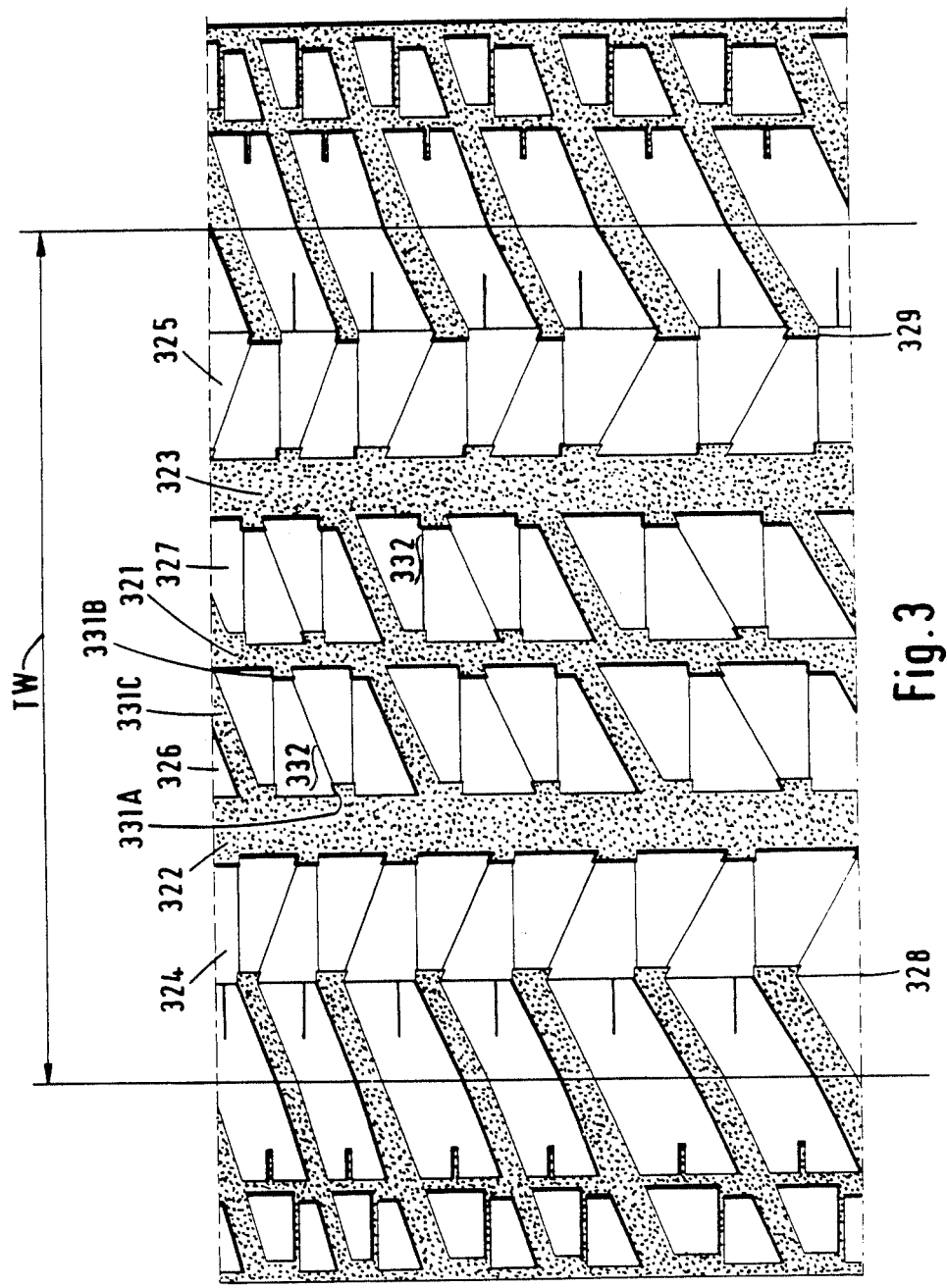

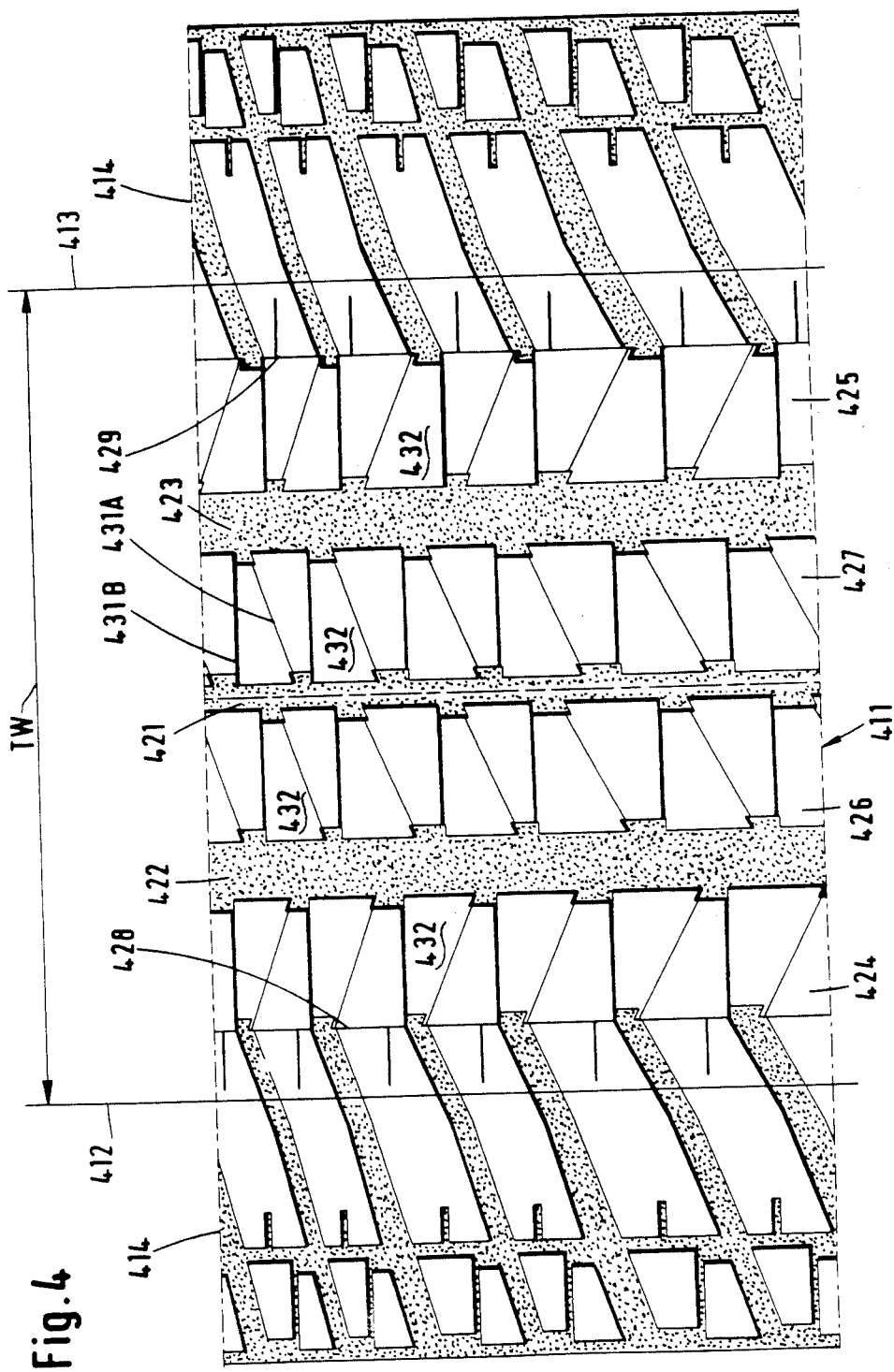

PNEUMATIC TIRE TREAD HAVING SIPES

BACKGROUND OF THE INVENTION

This invention relates generally to pneumatic tires for motor vehicles and in particular to tires for passenger cars.

Vehicle tires having treads comprising a plurality of block elements are well known. It is further that in tires for high speed passenger cars the treads may comprise a plurality of block elements arranged in axially spaced apart circumferential rows.

It is also known to form tire treads with circumferential ribs which are each divided into short sections by cross-slits. If the cross-slits are oriented at an acute angle relative to the mid-circumferential plane of the tire, then adjacent parts of the rib can move relative to each other resulting in a tire which exhibits good handling performance, reasonable traction, and good wear properties. Such a tire is illustrated in GB-A-No. 2 051 694 which teaches a tire primarily for use as a truck tire in a steering position.

There is disclosed herein a particular structure for tires having treads comprising circumferential ribs divided into short sections by cross-slits, which can be adapted for use as high performance tires, i.e. tires that can be used on passenger cars that are capable of running at speeds in excess of 190 km/hour (115 miles/hour).

There is provided in accordance with one aspect of the invention, a pneumatic tire comprising a ground contacting tread having a plurality of grooves extending circumferentially thereabout and two series of decoupling sipes which cooperate with one another to divide the tread into axially spaced apart lands, each of said lands being subdivided into a plurality of four-sided blocks by a series of cross-slits that extend across the respective lands, the cross-slits in each land being arranged to circumferentially alternate between first cross-slits extending in substantially axial directions and second cross-slits extending in directions which are inclined at acute angles with respect to the mid-circumferential plane of the tire, each of the cross-slits having a centerline that is a straight line and the blocks in each land being arranged such that circumferentially adjacent blocks are axially offset relative to each other thereby forming in the walls of the circumferential grooves a series of spaced notches.

The cross-slits may be in the form of sipes or blades, or may alternatively be a mixture of sipes and grooves. By "sipes" or "blades" are meant cross-slits which close up in the footprint of the tire and by "grooves" are meant cross-slits which do not close up in the footprint of the tire when the tire is mounted upon its specified rim, inflated to its recommended inflation pressure, and subjected to its rated load for said inflation pressure. It is understood for the purposes of the present invention that the specified rim, inflation and load for a tire may be determined either by the tire manufacturer's specifications as molded into a sidewall of a tire, or by the specifications published for a tire of a given size and ply/load rating as set forth in either the yearbook of The Tire and Rim Association, Inc. or the European Tyre and Rim Technical Organization for the year in which a tire is manufactured.

The terms "radial" and "radially" refer to planes which contain the axis of rotation of a tire, the terms "circumferential" and "circumferentially" refer to the direction of rotation of a tire, and the terms "axial" and "axially" refer to displacements parallel to the axis of rotation of a tire. The term "substantially axially" refers to directions that do not vary by more than 5° from being parallel to the axis of rotation of a tire.

The mid-circumferential plane of a tire is a plane which is perpendicular to the axis of rotation of the tire and which is located midway between the lateral edges of the tread in a footprint of the tire when the tire is mounted upon its specified rim, inflated to its recommended inflation pressure and subjected to its rated load for said inflation pressure.

BRIEF DESCRIPTION OF THE DRAWINGS

FIG. 3 is a fragmentary plan view of a tread illustrating a preferred embodiment of the invention; and FIG. 4 is a fragmentary plan view of a tread illustrating yet another preferred embodiment of the invention.

DETAILED DESCRIPTION OF THE INVENTION

Figure 1:
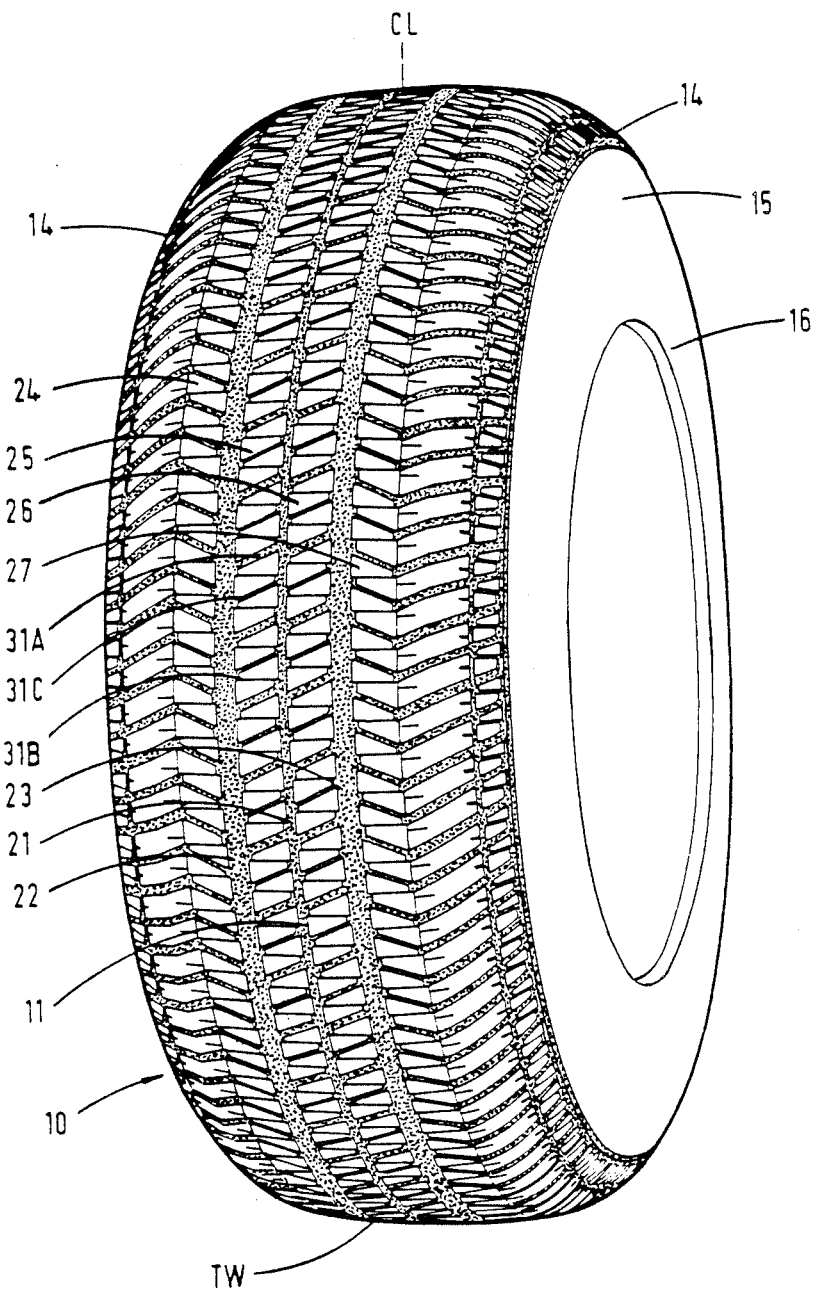
FIG. 1 is a perspective view of a tire according to this invention.
Figure 2:
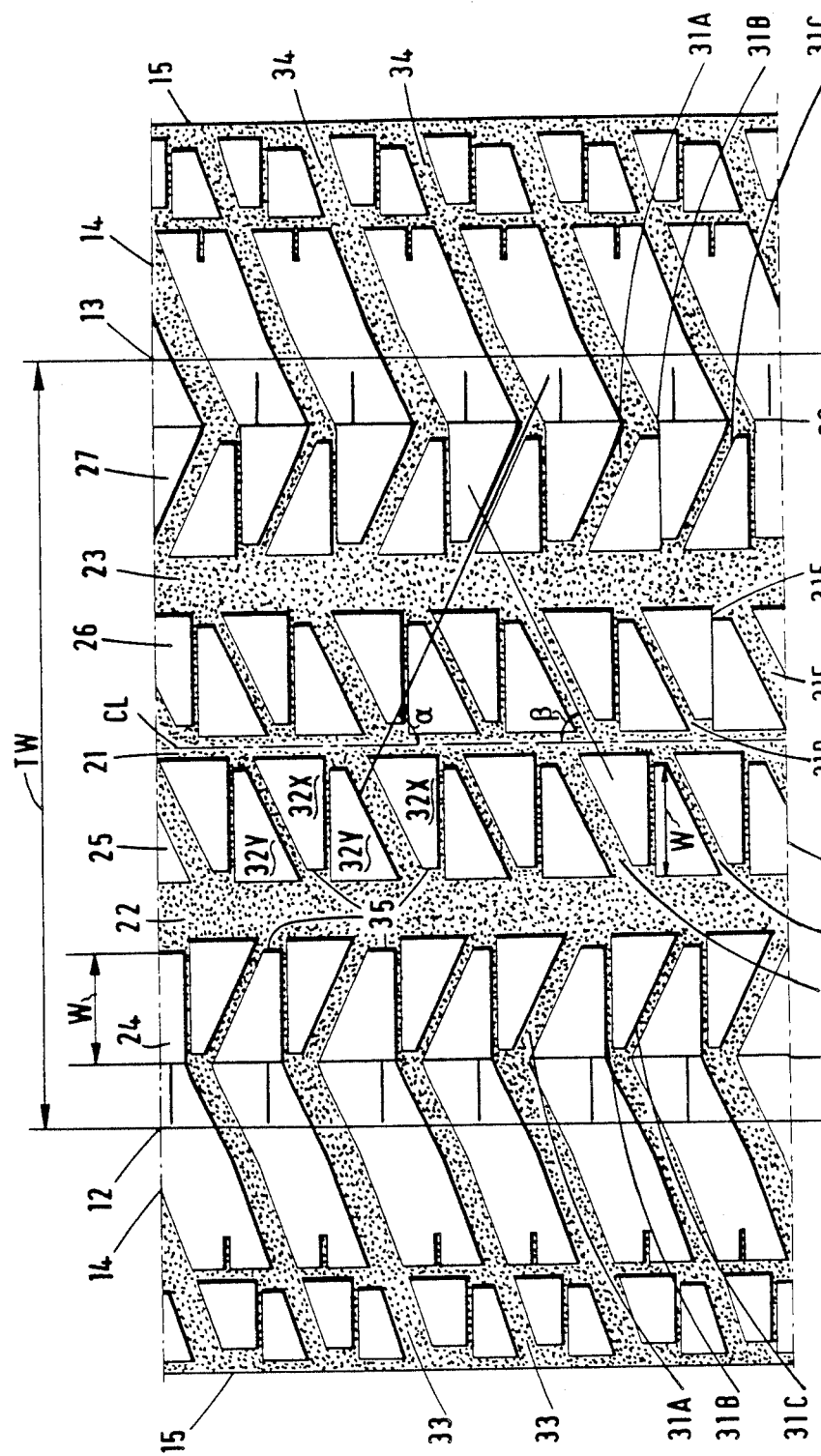
FIG. 2 is a fragmentary plan view of the tread of the tire illustrated in FIG. 1.

With reference to FIGS. 1 and 2, there is illustrated a pneumatic tire 10 according to the invention for use on a passenger car. A tire according to the invention has a radial carcass construction. The tire 10 has a ground contacting tread portion 11 having a pair of lateral edges 12,13, each of which are flanked by a shoulder region 14. Each shoulder region 14 extends radially inwardly to a sidewall 15, and each sidewall 15 terminates at its radially inner end in a bead portion 16 utilized for fitting the tire onto a rim.

The tread portion 11 has a plurality (preferably three) of grooves 21,22,23 extending circumferentially thereabout that divide the tread 11 into four axially spaced apart lands 24,25,26,27. The circumferentially extending grooves 21,22,23 comprise a central groove 21 which preferably has a centerline located on the mid-circumferential plane CL, and two flanking grooves 22,23 located one at each side of the central groove which cooperate with a circumferentially extending series of decoupling sipes 28,29 located close to each tread edge to divide the tread 11 into lands 24,25,26,27 which have substantially equal axial widths. The decoupling sipes 28,29 act to decouple the tread portion 11 from the shoulders 14 which as shown in each figure of the drawings comprise a circumferentially extending array of shoulder blocks. It is preferred that the net to gross ratio in the central portion of the tread be relatively high, i.e. greater than 75%. The "net to gross ratio" is understood to mean the ratio of the actual contact area of the tread to the ground in a tire footprint to the overall area of a tire footprint in the central portion of the tread. The "central portion" of the tread is understood to mean the portion of the tread disposed between the axially outermost edges of the axially outermost circumferentially extending grooves 22,23 on each side of the mid-circumferential plane CL. Accordingly, the circumferentially extending grooves 21,22,23 are arranged such that the central groove 21 has an axial width of approximately 4% of the tread width TW and is narrower than the two flanking grooves 22,23 which each have a width of approximately 11% of the tread width TW. The circumferentially extending grooves 21,22,23 each have a configuration such that a straight line can be drawn in the groove circumferentially about the tire without intersecting any of the sidewalls of the groove.

The tread 11 has a pair of lateral edges 12,13 which are axially spaced apart a distance referred to herein as the tread width TW. For the purpose of this invention the "tread width" TW is defined as the greatest axial distance across the tread measured from the footprint of a tire, when the tire is mounted on its specified rim, inflated to its specified inflation pressure and subjected to its rated load for said inflation pressure.

Each land 24,25,26,27 is subdivided into a plurality of blocks 32X,32Y by cross-slits 31A,31B,31C,31D,-31E,31F that extend across each respective land. Each of the cross-slits, whether it is a sipe or a narrow groove, has a centerline that is a straight line. The cross-slits are arranged so that in each land 24,25,26,27, first cross-slits 31B,31F extending in substantially axial directions, alternate circumferentially with cross-slits 31A,31C,31D,31E extending in directions inclined at acute angles with respect to the mid-circumferential plane CL of the tire.

In the present embodiment of the invention all of the bias angle cross-slits 31A,31C,31D,31E extending across a land 24,25,26,27 are oriented at substantially the same acute bias angle with respect to the mid-circumferential plane CL, allowing for pitching as is practiced in the industry for the reduction of tire noise. In a preferred embodiment, for the lands 25,26 located immediately on each side of the mid-circumferential plane CL, the bias cross-slits 31D,31E all are oriented at an angle $\beta$ of about 60° with respect to the mid-circumferential plane CL, and for the lands 24,27 located nearest the tread edges 12,13, all of the bias cross-slits 31A,31C are oriented at an equal but opposite bias angle $\alpha$ of about 60° with respect to the mid-circumferential plane. It is understood that an "acute" angle is an angle of less than 90° and that acute angles are "substantially the same" if they fall into a range of not greater than 10°. Angles of "about 60°" are understood to mean angles in the range of 55° to 65°.

The bias angle cross-slits are arranged on each side of the mid-circumferential plane CL such that projections of the centerlines of the cross-slits in adjacent lands form approximate "V" shapes which point in opposite directions of rotation. For example, projections of the centerlines of the biased cross-slits 31A,31C,31D,31E in the lands 26 and 27 form a "V" which points in an opposite direction to a "V" formed by projections of the centerlines of the biased cross-slits in the lands 24 and 25.

In each land 24,25,26,27, the axially extending cross-slits 31B,31F are in the form of sipes or blades. The bias angle cross-slits 31A,31C,31D,31E are in the form of grooves having different widths. The width of a groove is measured normal to the centerline of the groove. In each land, the wider grooves 31A,31E have a width in the range of 3 to 4% of the tread width TW and are arranged to alternate circumferentially with the narrow grooves 31C,31D having a width of approximately 1 to 2% of the tread width TW.

The axially extending cross-slits 31B,31F in each land 24,25,26,27 are arranged to be circumferentially off-set relative to the axially extending cross-slits 31B,31F in the other lands so that there is no circumferential alignment of the axially extending cross-slits across the tread 11.

The blocks formed in each land 24,25,26,27 by the subdividing cross-slits are arranged such that in each land alternate blocks 32X,32Y are axially off-set relative to each other by about 1 to 2% of the tread width TW thereby forming in the walls of the circumferentially extending grooves 21,22,23 a series of circumferentially spaced notches 35. The axial widths W of the blocks are substantially equal and are in the range of 18 to 20% of the tread width TW, as measured axially across any block 32X,32Y in each land.

The tread 11 is arranged so that the bias grooves 31A,31C in the lands 24,27 adjacent the edges 12,13 of the tread form an acute bias angle with the associated shoulder grooves 33,34 respectively.

The blocks 32X,32Y formed in each land each have a trapezoid or wedge shape with four straight sides and by alternating the bias cross-slits 31A,31C,31D,31E with axially extending cross-slits 31B,31F, there are formed pairs of axially opposed wedge shaped blocks 32X,32Y between next adjacent axially extending cross-slits. The independent blocks 32X,32Y provide good flexibility of the tread as they enter the footprint of the tire, and thereby reduce tread wear caused by scuffing of the tread as it distorts on contacting and leaving the road surface. The pairs of opposed wedge shaped blocks 32X,32Y in each land 24,25,26,27 help to provide lateral stability to the blocks, in that circumferentially adjacent blocks 32X,32Y on either side of an axially extending cross-slit 31B,31F will support one another in a footprint of the tire.

The grooves 21,22,23,31A,31C,31D,31E will have substantially equal depths on the tread of a new tire (that is the non-skid depth) and the sipes 31B,31F will have depths in the range of 80 to 85% of the non-skid depth. The great frequency of the sipes 31B,31F (there being approximately four blocks in each land 24,25,26,27 per pitch and some 55 pitches around the tread) ensures good traction and braking properties.

A second and most preferred embodiment of the invention is shown in FIG. 3 and is very similar to the tire described with reference to FIGS. 1 and 2, and only the differences from that tire will be highlighted. The tread is divided up into four lands 324,325,326,327 by three circumferential grooves 321,322,323, and the lands 324,325,326,327 are subdivided into blocks 332 by cross-slits 331A,331B,331C, and decoupling sipes 328,329 as before. In the axially outermost land 324,325 on each side of the mid-circumferential plane all of the cross-slits are sipes. This means that the lands nearest the shoulder portions act as a continuous rib in the tire footprint to minimize shoulder wear.

However, with respect to the lands 326,327 immediately on either side of the mid-circumferential plane, the axially extending cross-slits 331B are all in the form of sipes or blades, the cross-slits 331A,331C extending at acute angles, preferably at about 60° with respect to the mid-circumferential plane, alternate between being sipes and grooves, cross-slits 331A being in the form of sipes and cross-slits 331C being in the form of grooves. This results in the blocks 332 of each land being arranged around the circumference of the tire in groups of four which will act together with one another in a footprint of the tire as described above.

A third embodiment of the invention is shown in FIG. 4 and is very similar to the tires described with reference to FIGS. 1, 2 and 3 and only the differences from those tires will be highlighted. The tread 411 is divided into four lands 424,425, 426,427, by three circumferentially extending grooves 421,422,423 and circumferentially extending sipes 428,429 as before. However, the lands 424,425, 426,427 are subdivided into blocks 432 by cross-slits 431A,431B which in this case comprise only sipes. Again, axially extending cross-slits 431B alternate with bias cross-slits 431A, except in this embodiment all of the bias cross-slits are sipes.

The lands 424,425 nearest the shoulders 414 present a closed tread, that is to say a continuous rib, in the footprint of a tire giving minimum shoulder wear and increased lateral stability. The very large number of sipes 431A,431B gives enhanced traction and wet grip properties. Since the sipes are closed in the footprint of the tire, the lands effectively act as ribs, and the wedge shaped blocks 432 all provide lateral support for circumferentially adjacent blocks.

While the invention has been described with reference to the accompanying examples, it will be apparent to those skilled in the art that minor alterations and changes can be made without departing from the scope or spirit of the invention.

We claim:

1. A pneumatic tire comprising a ground contacting tread having two tread edges, at least three grooves in said tread extend circumferentially thereabout, a circumferentially extending series of decoupling sipes is located close to each tread edge axially outwardly of all of said circumferentially extending grooves, a central one of said circumferentially extending grooves being located midway between said tread edges and at least one circumferentially extending groove being disposed on each side thereof, said circumferentially extending grooves and decoupling sipes cooperating to divide the tread into at least four axially spaced ribs, each of said ribs being subdivided by sipes into a plurality of blocks which each have only four sides all of which are straight, the sipes in each rib being arranged to circumferentially alternate between first sipes extending in substantially axial directions and second sipes extending in directions oriented at substantially the same acute bias angles with respect to the mid-circumferential plane of the tire, each of the sipes having a centerline that is a straight line, the blocks in each rib being arranged such that circumferentially adjacent blocks are axially offset relative to each other thereby forming walls of the circumferentially extending grooves having a series of spaced notches, each said circumferentially extending series of decoupling sipes separating one of said ribs from a circumferentially extending array of shoulder blocks.

2. A tire as claimed in claim 1 wherein the second sipes in each respective rib all extend at an angle of about 60° with respect to the mid-circumferential plane of the tire.

3. A tire as claimed in either of claims 1 or 2 wherein the first sipes in any rib are circumferentially offset relative to the first sipes in any other rib.

4. A tire as claimed in claim 1 wherein the central circumferentially extending groove has a narrower axial width than the circumferentially extending grooves arranged on each side of the said central groove and which are of equal axial widths.

5. A tire as claimed in any one of claims 1, 2, or 4 wherein projections of the centerlines of the second sipes in the ribs on one side of the mid-circumferential plane make a "V" formation which points in the opposite direction to a similar "V" formation formed by the projections of the centerlines of the second sipes on the other side of the mid-circumferential plane.

6. A tire as claimed in claim 3 wherein projections of the centerlines of the second sipes in the ribs on one side of the mid-circumferential plane make a "V" formation which points in the opposite direction to a similar "V" formation formed by the projections of the centerlines of the second sipes on the other side of the mid-circumferential plane.

7. A pneumatic tire comprising a ground contacting tread portion having two tread edges, at least three grooves in said tread extending circumferentially thereabout and a circumferentially extending series of decoupling sipes is located close to each tread edge axially outwardly of all of said circumferentially extending grooves, one of said circumferentially extending grooves being centrally located midway between said tread edges and at least one of the other circumferentially extending grooves is disposed on each side of said centrally located grove, disposed between each series of decoupling sipes and the nearest circumferentially extending groove is a rib, each of said ribs being subdivided into a plurality of four-sided blocks by sipes that extend across the ribs, the sipes in each rib being arranged to circumferentially alternate between first sipes extending in substantially axial directions and second sipes extending at substantially the same acute bias angles with respect to the mid-circumferential plane of the tire, each of said circumferentially extending series of decoupling sipes separating one of said ribs from a circumferentially extending array of shoulder blocks, disposed between each pair of next-adjacent circumferentially extending grooves are groups comprising four blocks each with said groups of blocks being disposed about the circumference of the tire, circumferentially adjacent groups of blocks being separated by grooves which all have straight centerlines and extend at substantially the same acute bias angles with respect to the mid-circumferential plane of the tire, the blocks in each group being separated by two sipes that extend in substantially axial directions and a third sipe disposed between said two sipes and which extends at an acute bias angles with respect to the mid-circumferential plane of the tire, each of said sipes in said ribs and separating the blocks of said groups having a centerline that is a straight line, and the blocks in each said group of four blocks being arranged such that circumferentially adjacent blocks being axially offset relative to each other thereby forming walls of the circumferentially extending grooves having a series of spaced notches.

8. A tire as claimed in claims 7 wherein the centrally located circumferentially extending groove has a narrower axial width than the other two circumferentially extending grooves.

9. A tire as claimed in either one of claims 7 or 8 wherein all of said grooves have substantially equal depths and said sipes have depths in the range of 80 to 85% of the depths of said grooves.

10. A tire as claimed in either one of claims 7 or 8 wherein the sipes and grooves oriented at acute angles with respect to the mid-circumferential plane are arranged on each side of the mid-circumferential plane such that projections of the centerlines of said sipes and grooves form "V" shapes which point in opposite directions from the "V" shapes on the other side of the mid-circumferential plane.

11. A tire as claimed in claim 9 wherein the sipes and grooves oriented at acute angles with respect to the mid-circumferential plane are arranged on each side of the mid-circumferential plane such that projections of the centerlines of said sipes and grooves form "V" shapes which point in opposite directions from the "V" shapes on the other side of the mid-circumferential plane.

12. A tire as claimed in claim 11 wherein the centrally located circumferentially extending groove has an axial width of approximately 4% of the tread width and the other circumferentially extending grooves have widths of approximately 4% of the tread width, and the central portion of the tread has a net to gross ratio of greater than 75%.

13. A tire as claimed in claim in either one of claims 7 or 8 wherein all of said acute bias angles are about 60° with respect to the mid-circumferential plane of the tire.

14. A tire as claimed in claim 9 wherein all of said acute bias angles are about 60° with respect to the mid-circumferential plane of the tire.

15. A tire as claimed in claim 10 wherein all of said acute bias angles are about 60° with respect to the mid-circumferential plane of the tire.

16. A tire as claimed in claim 11 wherein all of said acute bias angles are about 60° with respect to the mid-circumferential plane of the tire.

17. A tire as claimed in claim 12 wherein all of said acute bias angles are about 60° with respect to the mid-circumferential plane of the tire.

* * * * *